United States Patent
Böttcher et al.

(10) Patent No.: US 9,488,105 B2
(45) Date of Patent: Nov. 8, 2016

(54) GAS TURBINE ASSEMBLY AND METHOD THEREFOR

(75) Inventors: Andreas Böttcher, Mettmann (DE); Timothy A. Fox, Hamilton (CA); Daniel W. Garan, Chuluota, FL (US); Thomas Grieb, Krefeld (DE); Jens Kleinfeld, Mülheim an der Ruhr (DE); Tobias Krieger, Oberhausen (DE); Stephen A. Ramier, Fredericton (CA); David M. Ritland, Winter Park, FL (US); Marcus Zurhorst, Mülheim an der Ruhr (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 604 days.

(21) Appl. No.: 13/885,710

(22) PCT Filed: Nov. 30, 2011

(86) PCT No.: PCT/EP2011/071340
§ 371 (c)(1),
(2), (4) Date: Jun. 20, 2013

(87) PCT Pub. No.: WO2012/072659
PCT Pub. Date: Jun. 7, 2012

(65) Prior Publication Data
US 2014/0130502 A1     May 15, 2014

Related U.S. Application Data

(63) Continuation of application No. 12/957,476, filed on Dec. 1, 2010, now abandoned.

(51) Int. Cl.
| F02C 7/22 | (2006.01) |
| F23R 3/28 | (2006.01) |
| F02C 7/20 | (2006.01) |

(52) U.S. Cl.
CPC .............. *F02C 7/20* (2013.01); *F23R 3/283* (2013.01); *F23R 3/286* (2013.01);
(Continued)

(58) Field of Classification Search
CPC ........ F02C 7/222; F23R 3/283; F23R 3/286; F23R 3/34
See application file for complete search history.

(56) References Cited

U.S. PATENT DOCUMENTS 4,185,462 A * 1/1980 Morse, II ............... F02C 7/222
                                                        285/13
4,216,651 A   8/1980 Ormerod
(Continued)

FOREIGN PATENT DOCUMENTS

| DE | WO 2009065625 A1 * | 5/2009 | ............. F23D 11/36 |
| EP | 2189720 A1 | 5/2010 | |
| WO | WO 2009039142 A2 | 3/2009 | |

*Primary Examiner* — Phutthiwat Wongwian
*Assistant Examiner* — Rene Ford

(57) ABSTRACT

An assembly for a gas turbine is presented. The assembly includes a gas supply pipe passing through a bore in a flange of the gas turbine for supplying gas to a combustion chamber of the gas turbine and a sleeve surrounding the gas supply pipe, having a first end and a second end, wherein the first end is sealingly coupled to the gas supply pipe, and wherein the sleeve is adapted to be sealingly coupled to the flange at the second end such that the sleeve extends along a thickness of the flange.

17 Claims, 8 Drawing Sheets

(52) U.S. Cl.
CPC .............. *F23R 2900/00005* (2013.01); *F23R 2900/00012* (2013.01); *F23R 2900/00017* (2013.01); *Y10T 29/49229* (2015.01)

(56) References Cited

U.S. PATENT DOCUMENTS

| | | | | |
|---|---|---|---|---|
| 4,216,652 A * | 8/1980 | Herman | ................. | F23C 7/004 239/400 |
| 4,441,323 A * | 4/1984 | Colley | ................... | F23R 3/283 60/737 |
| 4,903,476 A * | 2/1990 | Steber | .................... | F23R 3/283 431/264 |
| 5,261,240 A * | 11/1993 | Oyler | ................. | F16L 19/0231 285/80 |
| 5,279,112 A * | 1/1994 | Halila | ............... | F02M 37/0017 285/13 |
| 5,491,970 A * | 2/1996 | Davis, Jr. | .................. | F23R 3/28 60/776 |
| 5,771,696 A * | 6/1998 | Hansel | .................... | F23R 3/283 60/739 |
| 2004/0006992 A1* | 1/2004 | Stuttaford | ............... | F23R 3/286 60/776 |
| 2004/0011054 A1* | 1/2004 | Inoue | ........................ | F23R 3/10 60/776 |
| 2008/0000447 A1 | 1/2008 | Locatelli | | |
| 2008/0029068 A1* | 2/2008 | Graham | .................. | F02C 7/222 123/456 |
| 2008/0066720 A1* | 3/2008 | Piper | ....................... | F23R 3/283 123/470 |
| 2010/0066035 A1 | 3/2010 | Berry | | |
| 2010/0285415 A1* | 11/2010 | Bottcher | ................. | F23D 11/36 431/159 |

* cited by examiner

GAS TURBINE ASSEMBLY AND METHOD THEREFOR

CROSS REFERENCE TO RELATED APPLICATIONS

This application is the US National Stage of International Application No. PCT/EP2011/071340 filed Nov. 30, 2011, and claims the benefit thereof. The International Application claims the benefits of U.S. application Ser. No. 12/957,476 US filed Dec. 1, 2010. All of the applications are incorporated by reference herein in their entirety.

FIELD OF THE INVENTION

The present invention relates to a gas turbine and more particularly to an assembly for the gas turbine to provide a sealing mechanism and a method for assembling the assembly for the gas turbine.

BACKGROUND OF THE INVENTION

In a gas turbine, fuel is delivered through a supply pipe to a combustion chamber where the fuel is mixed with hot air from a compressor to produce a working gas. Particularly, fuel is passed through a rocket unit which includes rockets, the fuel is directed through the rockets into respective swirlers, wherein the hot air from compressor is turbulated and mixed with the fuel and discharged through outlets of the respective swirlers.

During an operation of the gas turbine, cold gas is supplied through the supply pipe; however, other components may be heated to high temperature from hot air coming out of the compressor of the gas turbine. The hot air causes thermal expansion of various components of the gas turbine. It is therefore important to provide a sealing arrangement to prevent hot air from the compressor to heat other components of the gas turbine, as well as prevent the hot air from the compressor to exit the gas turbine to the surrounding environment.

Accordingly, a manifold surrounding the supply pipe and having an internal distribution system of fuel supply is used. However, the manifold is expensive since it is made of material which is corrosion resistant.

It is therefore desirable to provide a flexible and cost effective sealing arrangement for a gas turbine to prevent hot air from the compressor exiting the gas turbine. Further, it is desirable that the sealing arrangement also reduces thermal stress arising due to thermal expansion of the components exposed to the hot air during operation of the gas turbine.

SUMMARY OF THE INVENTION

Briefly in accordance with one aspect of the present invention an assembly for a gas turbine is presented. The assembly includes a gas supply pipe passing through a bore in a flange of the gas turbine for supplying gas to a combustion chamber of the gas turbine and a sleeve surrounding the gas supply pipe, having a first end and a second end, wherein the first end is sealingly coupled to the gas supply pipe, and wherein the sleeve is adapted to be sealingly coupled to the flange at the second end such that the sleeve extends along a thickness of the flange.

In accordance with another aspect of the present technique, a method for assembling a gas turbine assembly is presented. The method includes passing a gas supply pipe through a bore in a flange for supplying gas to a combustion chamber of the gas turbine, circumscribing the gas supply pipe with a sleeve having a first end and a second end, extending the sleeve through the thickness of the flange, sealingly coupling the first end of the sleeve with the gas supply pipe and sealingly coupling the second end of the sleeve to the flange.

In accordance with yet another aspect of the present technique, a gas turbine is presented. The gas turbine includes a compressor for supplying hot air, a combustion chamber for generating a working gas by mixing gas and the hot air from the compressor. Further, the gas turbine includes an assembly comprising a gas supply pipe passing through a bore of a flange for supplying gas to the combustion chamber and a sleeve surrounding the gas supply pipe, extending along a thickness of the flange, having a first end and a second end, wherein the first end is sealingly coupled to the gas supply pipe and the second end is sealingly coupled to the flange.

BRIEF DESCRIPTION OF THE DRAWINGS

The present invention is further described hereinafter with reference to illustrated embodiments shown in the accompanying drawings, in which.

DETAILED DESCRIPTION OF THE INVENTION

Figure 1:
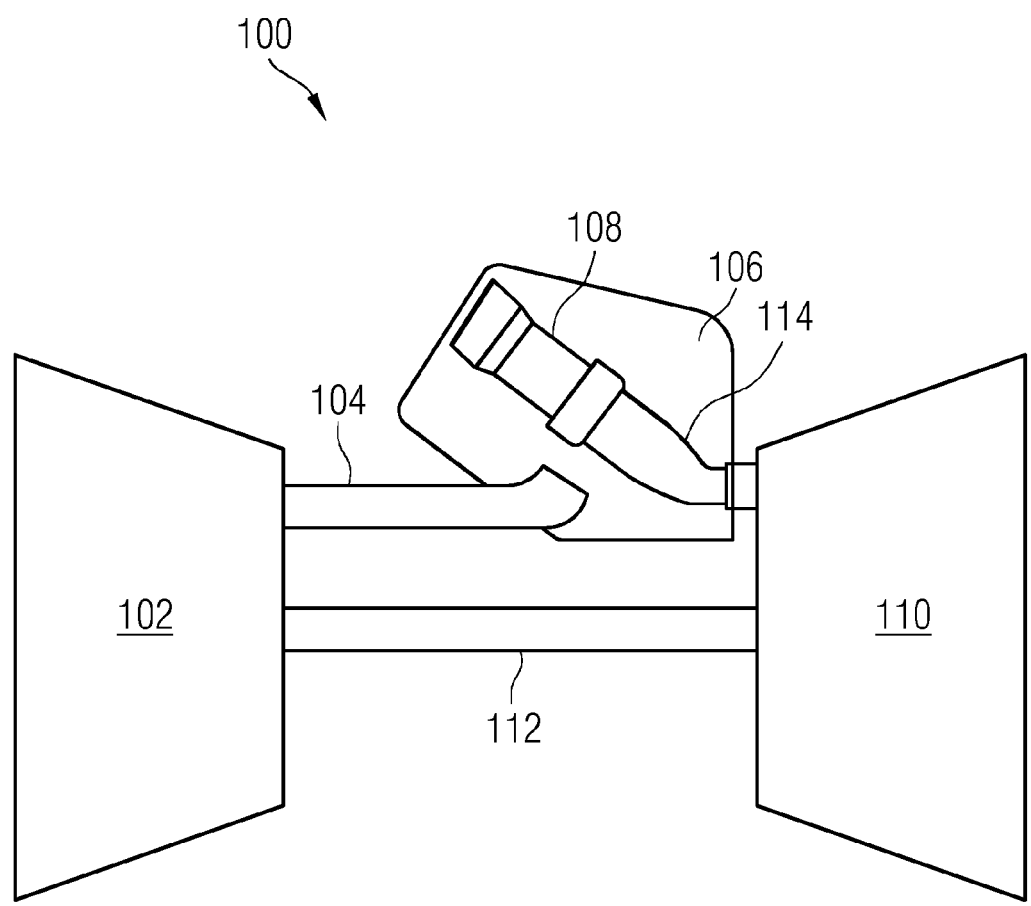
FIG. 1 is a schematic cross-sectional diagram of a gas turbine.

FIG. 1 depicts a schematic cross section of a gas turbine 100 that includes various embodiments of the present invention. The gas turbine comprises a compressor 102, a combustion chamber 108 and a turbine 110. During operation, the compressor 102 takes in air and provides a compressed air to a diffuser 104, which passes the compressed air to a plenum 106 through which the compressed air passes to the combustion chamber 108, which mixes the compressed air with fuel or gas, providing combustion gases also known as the working gas via a transition to the turbine 110, which may be used to generate electricity for example. A shaft 112 is shown connecting the turbine 110 to drive the compressor 102.

Figure 2:
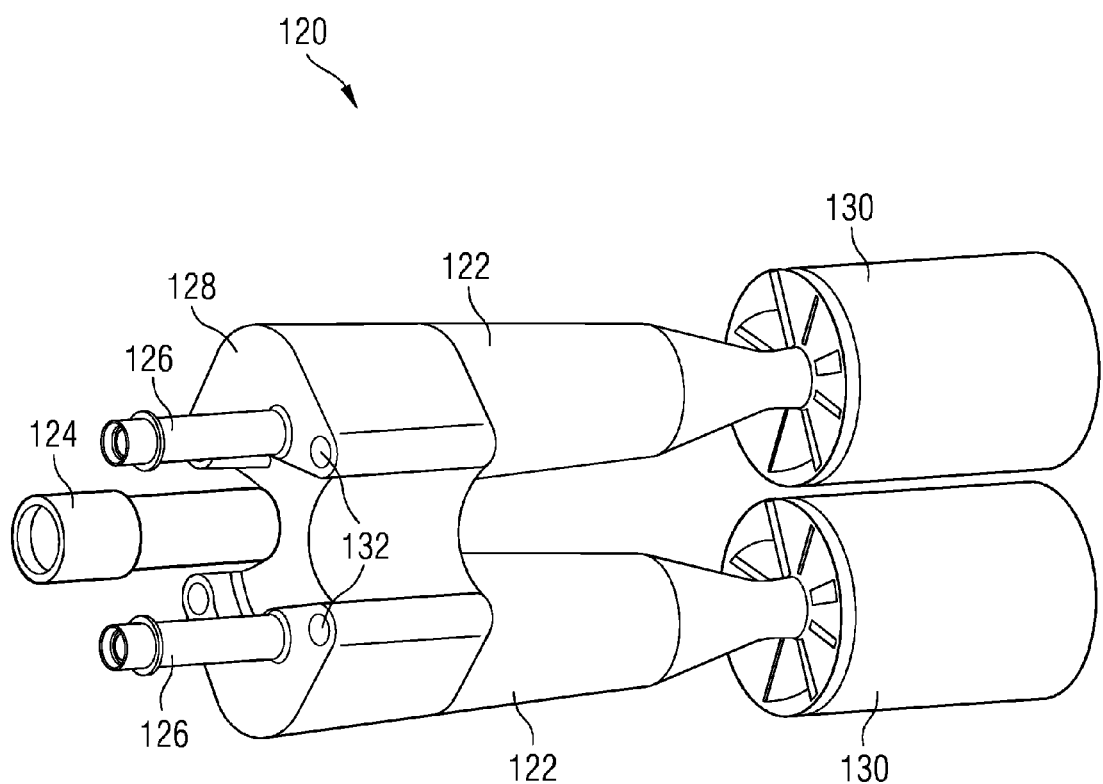
FIG. 2 is a diagrammatical illustration of an exemplary rocket unit.

FIG. 2 depicts a double rocket unit 120 according to an aspect of the present technique. A plurality of rockets 122 having a base 128 is depicted. A pipe 124 supplies gas to a pilot burner (not shown). Gas from gas supply pipes 126 is passed into the rockets 122. The air from the compressor 102 of FIG. 1 is mixed with the fuel in swirlers 130 which are attached at free or distal end of the rockets 122. The swirlers 130 generate turbulence in the air stream. Gas is mixed with the turbulent air stream in the swirlers 130 and combusted in the combustion chamber 108 to generate energy. Holes 132 for the purpose of bolting are provided to attach the rocket unit 120 to a flange which will be described with respect to FIG. 3.

Figure 3:
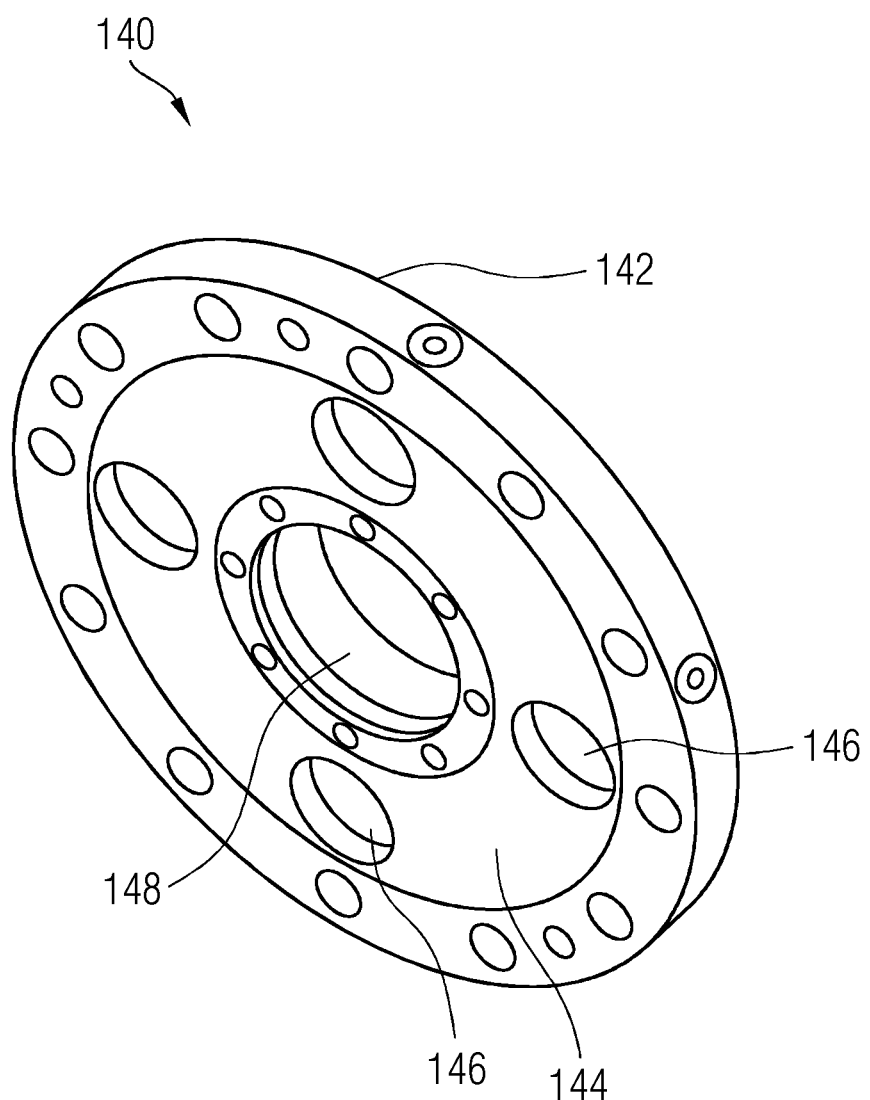
FIG. 3 is diagrammatical illustration of a flange.

FIG. 3 is a diagrammatical illustration depicting a flange 140 for the gas turbine. The flange includes a first side 142 and a second side 144. The first side 142 is a hot side exposed to hot air produced from the compressor. The second side 144 may be referred to as a cold side. The flange 140 includes one or more bore 146 through which a gas supply pipe 126 (see FIG. 2) is passed for supplying gas to the rocket unit 120. The rocket unit 120 is attached to the flange 140 from the first side 142 for providing a stable arrangement. The base 128 of the rocket unit 120 is attached to the flange 140 through bolting, thereby preventing movement and providing enhanced stability to the rocket unit 120.

During operation, the flange 140 is subjected to hot air coming from the compressor 102. More particularly, the first side 142 of the flange 140 is subjected to hot air coming from the compressor 102. The flange 140 may be heated to a temperature of about 350 degree Celsius. However, the gas supply pipe 126 supplies cold gas at a temperature of about 20 degree Celsius. The hot air from the compressor 102 causes thermal expansion of the flange 140 in an axial direction and a radial direction.

Figure 4:
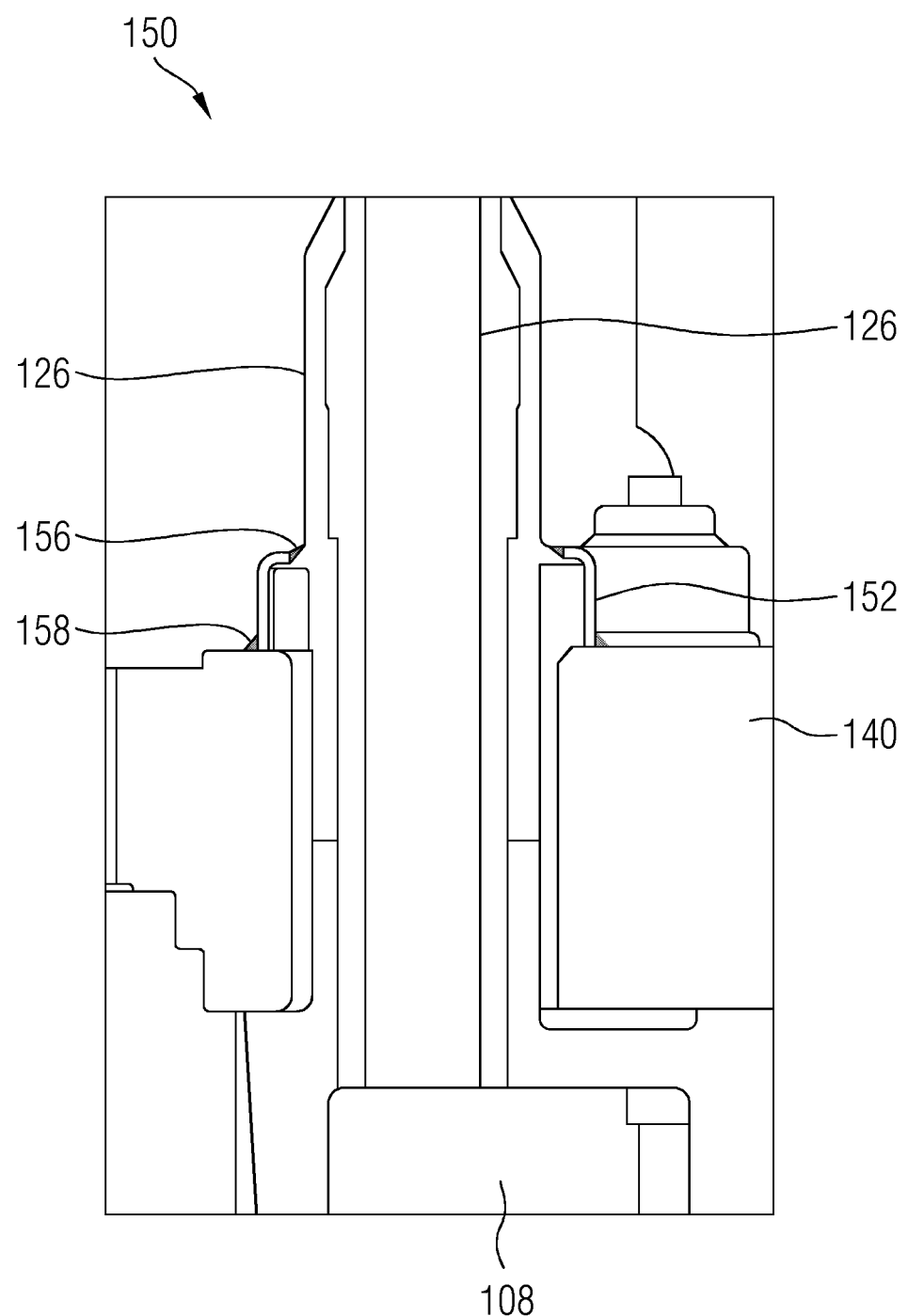
FIG. 4 is a diagrammatical illustration depicting one embodiment of an assembly for a gas turbine.

FIG. 4 is a diagrammatical illustration depicting a cross-sectional view of an embodiment of gas turbine assembly 150 along a longitudinal direction. A longitudinal section of a gas supply pipe 126 is depicted passing through a flange 140. More particularly, the gas supply pipe 126 passes through a bore 146 (see FIG. 3) in the flange 140. A close out fitting 152, which is cylindrical in shape, is placed concentrically over the gas supply pipe 126. The close out fitting 152 is welded to the gas supply pipe 126 at a first joint 156 and also welded to the flange 140 at a second joint 158 as depicted. The close out fitting 152 and the gas supply pipe 126 are rotational symmetric along a longitudinal axis passing through a center of the gas supply pipe 126. Therefore, the first joint 156 is ring shaped around the circumference of the gas supply pipe, and the second joint 158 is also ring-shaped. The gas supply pipe 126 is also fastened to the flange 140 through bolting. It may be noted that the close out fitting 152 is attached to the flange 140 at a first side distal to the combustion chamber 108 and the bolting is also done on the first side of the flange 140 distal to the combustion chamber 108. However, such an arrangement may make the system over determined.

During the operation of the gas turbine, the flange 140 which is subjected to hot air produced by the compressor (not shown) expands in an axial direction as well as in a radial direction. Due to high temperature of the hot air the flange 140 is thermally expanded, however, the gas supply pipe 126 carries cold gas which maintains the gas supply pipe 126 at a relatively cold temperature. The close out fitting 152 is attacked to the cold gas supply pipe therefore due to difference in temperatures, high stress occur at the first joint 156 and the second joint 158. By using the close out fitting 152 to couple the gas supply 126 and the flange 140, scope of thermal expansion is reduced, since the assembly becomes over determined. Also, due to over determination the flange 140 and the gas supply pipe 126 of the gas turbine are unable to undergo thermal expansion and thus the life span of these components is decreased.

In accordance with aspects of the present technique, an assembly for a gas turbine is presented. The assembly includes a gas supply pipe passing through a bore in a flange for supplying gas to a combustion chamber of the gas turbine and a sleeve surrounding the gas supply pipe, having a first end and a second end, wherein the first end is sealingly coupled to the gas supply pipe, and wherein the sleeve is adapted to be sealingly coupled to the flange at the second end such that the sleeve extends along a thickness of the flange. By having a sleeve surrounding the gas supply pipe, attached to the gas supply pipe at the first end and the flange at the second end, the sleeve extending along the thickness of the flange, thermal stress occurring due to expansion at the welded joints is reduced due to the distribution of stress to the sleeve along the length of the sleeve.

Figure 5:
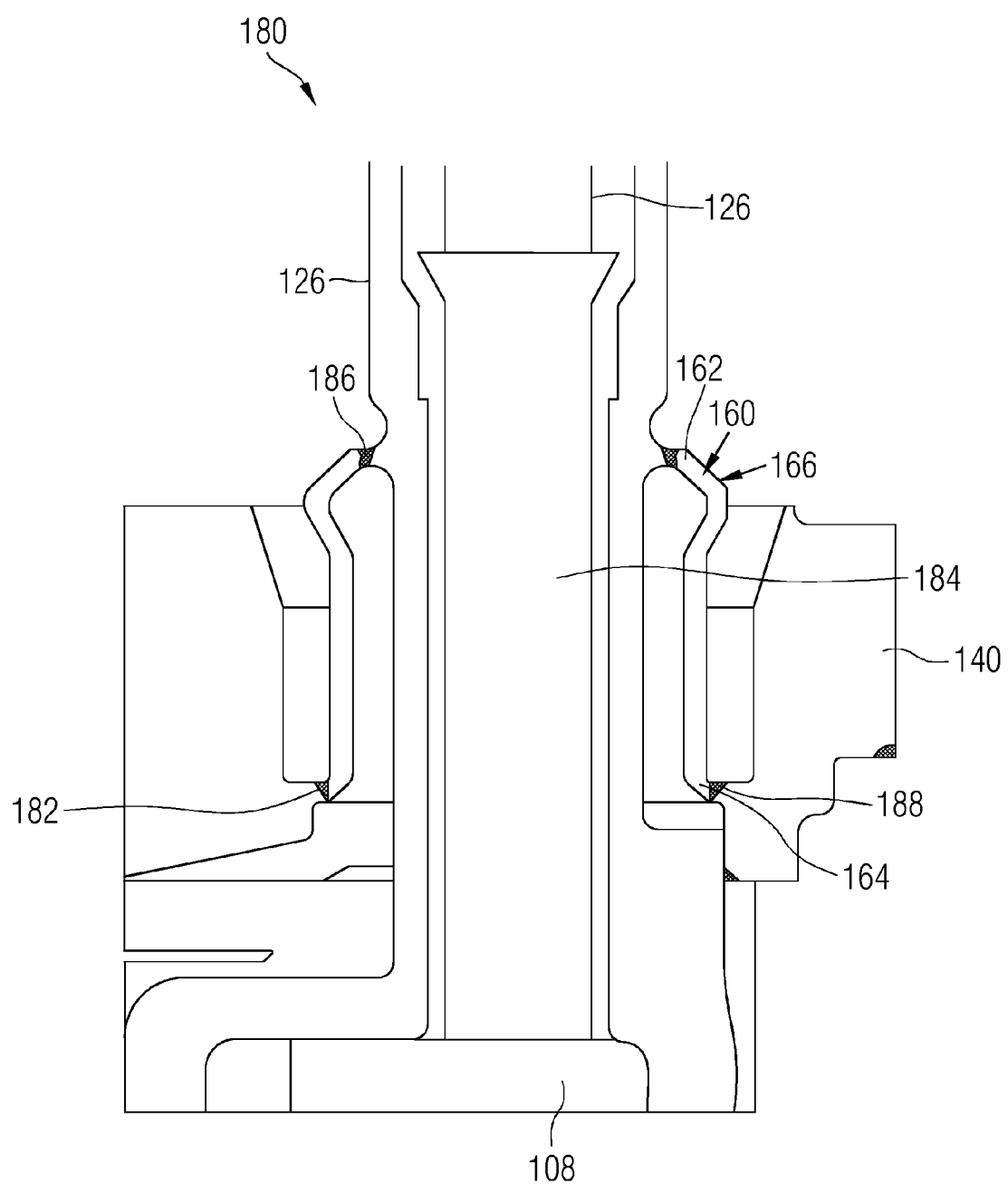
FIG. 5 is a cross sectional view of another embodiment of an assembly for the gas turbine.

Referring now to FIG. 5, a cross-sectional view of an exemplary assembly 180 for a gas turbine is depicted. The assembly 180 includes the gas supply pipe 126 passing through the bore 146 (see FIG. 3) of the flange 140 of the gas turbine. The gas supply pipe 126 supplies gas to the combustion chamber 108 of the gas turbine. In addition, the assembly includes a sleeve 160 as depicted, surrounding the gas supply pipe 126. A first end 162 of the sleeve is sealingly coupled to the gas supply pipe 126 which means that the first end is coupled to seal the gas supply pipe from the surrounding environment of hot air. A second end 164 of the gas supply pipe 126 is adaptively coupled to the flange 140. The sleeve 160 has a length that extends from outside the bore of the flange 140 extending to the thickness of flange. More particularly, the first end 162 of the sleeve 160 is located at a first longitudinal position of the sleeve 160 outside the bore of the flange 140 distal to the combustion chamber 108, as depicted. The second end 164 is coupled on the inside of the bore of the flange 140. Coupling the sleeve 160 to the flange 140 at the second end 164 enables welding of the second end 164 of the sleeve inside the bore in the flange 140.

In addition, the second end 164 of the sleeve 160 is located at a second longitudinal position of the sleeve 160 inside the bore in the flange 140 in a half towards the combustion chamber 108. The location of the first end 162 and the second end 164 of the sleeve 160 as mentioned hereinabove makes the longitudinal length of the sleeve at least half the thickness of the flange 140. The extent of the sleeve 160 as described hereinabove enables compensating the effect of thermal expansion. It may be noted that the longitudinal length of the sleeve 160 is greater than the longitudinal length of the close out fitting 152 of FIG. 4. By increasing the distance between the positions where the sleeve is coupled to the gas supply pipe and the flange, the effective thermal expansion which leads to the stress at the first end and the second end is reduced.

With continuing reference to FIG. 5, the sleeve 160 is welded at the first end 162 to couple to the gas supply pipe 126. Similarly, the sleeve 160 is welded on the inside of the bore in the flange 140. Welding seams 186, 188 are depicted at locations where the sleeve 160 is attached to the gas supply pipe 126 and the flange 140 respectively.

The sleeve as depicted in FIG. 5 includes a longitudinal section 166 which is located outside the bore of the flange 140; the longitudinal section 166 is radially extended around the circumference of the sleeve 160 to enable reduction of thermal stress, which will be described in greater detail with reference to FIG. 6 and FIG. 7.

In addition, the assembly 180 also includes a heat shield 184 inside the gas supply pipe. The heat shield 184 prevents thermal deformation of the gas supply pipe 126 due to the hot air stream produced from the compressor. The heat shield 184 may be formed from a material which is corrosion resistant to gas, such as, but not limited to stainless steel.

Figure 6:
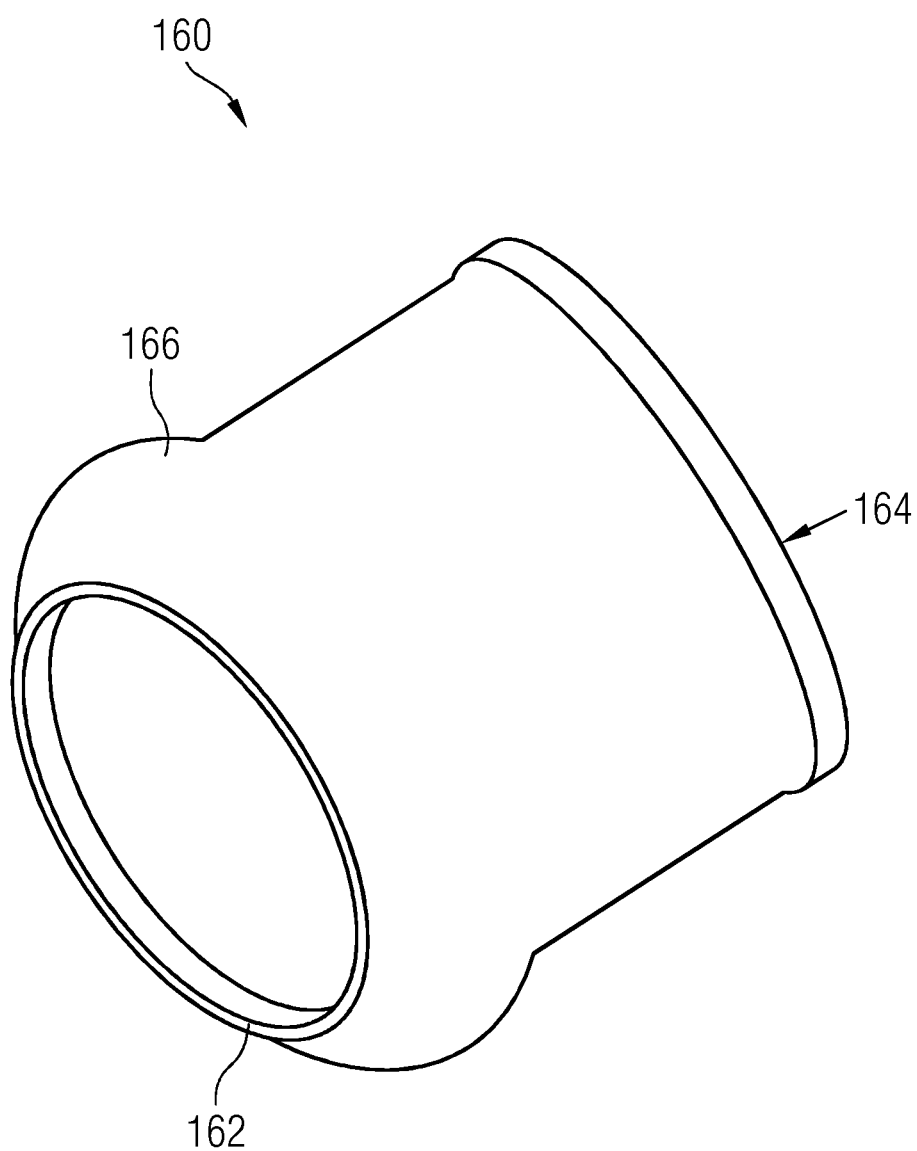
FIG. 6 is diagrammatic illustration of an exemplary sleeve.

Referring now to FIG. 6, the exemplary sleeve 160 of FIG. 5 is depicted. The sleeve 160 includes the first end 162 and the second end 164. The sleeve 160 is cylindrical in shape; however, the sleeve 160 may be formed in other shapes that allow thermal expansion as well as thermal stress reduction. It may be noted that thermal stress is caused due to the longitudinal expansion.

In accordance with aspects of the present technique, the sleeve 160 is formed from a material that has a high strength, excellent fabricability (including joining) and corrosion resistance. An alloy such as Inconel® 625, which is a nickel chromium alloy from Special Metals Corporation, U.S.A. is used for making the sleeve 160. Furthermore, the diameter of the sleeve 160 at the first end 162 is less than the diameter of the sleeve 160 at the second end 164. The sleeve 160 includes a longitudinal section 166 which is radially extended around the circumference of the sleeve 160. A longitudinal profile for the longitudinal section 166 of the sleeve includes a first portion 196 and a second portion 198, the first portion 196 making a first angle with a longitudinal axis 192 and a second portion 198 making a second angle with the first portion 196 to provide the radial extension.

In one embodiment, the first angle is about 45 degrees from the longitudinal axis 192 and the second angle is about 105 degrees from the first portion 196. In other words, the first portion and the second portion form a V-shaped structure perpendicular to the longitudinal axis 192. The radial extension helps in reducing the stress at the location of welding due to an inclination provided by the section 166. This section 166 is located at a position which is proximal to the first end 162 of the sleeve 160. An open space above the flange 140 distal from the combustion chamber provides space for radially extending the longitudinal section 166.

Figure 7:
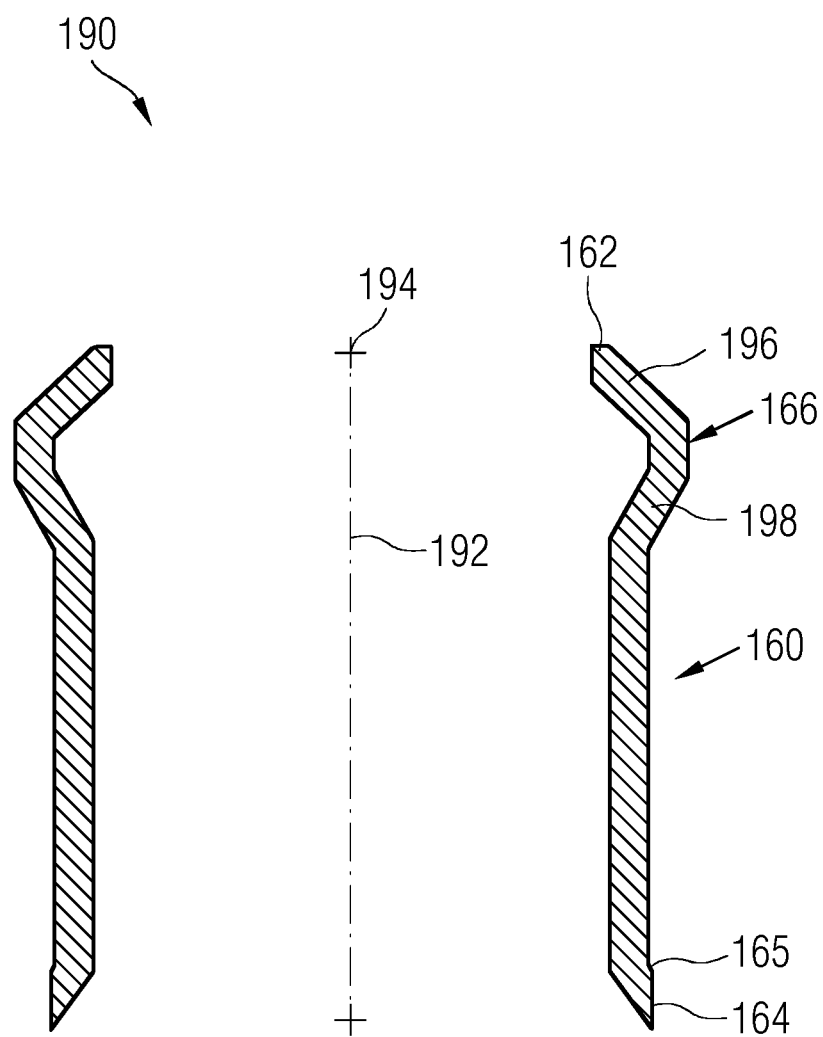
FIG. 7 is a cross sectional view of the exemplary sleeve of FIG. 6.

FIG. 7 depicts a cross-sectional view 190 of the sleeve 160 of FIG. 6 in a longitudinal direction. As previously noted the sleeve 160 has a first end 162 and a second end 164. The sleeve 160 is rotationally symmetric around a longitudinal axis 192 passing through a center 194 of the sleeve 160, which enables it to circumscribe the gas supply pipe. In one embodiment, the sleeve 160 is cylindrical in shape to circumscribe the gas supply pipe.

In accordance with aspects of the present technique, the longitudinal section 166 is radially extended around the circumference of the sleeve. The radial extension is such that the first end 162 of the sleeve 160 is adapted to couple to the gas supply pipe 126 at an oblique angle. More particularly, the radially extended longitudinal section 166 at the first end of the sleeve extends inwards, that is, towards the gas supply pipe, couples at an oblique angle. As will be appreciated, the oblique angle enables reducing the stress component at the first end 162, since the stress component is at an angle rather than horizontal, the oblique angle further makes the first end easier to weld to the gas supply pipe. In one embodiment, the oblique angle may be about 45 degrees from the longitudinal axis 192 passing through the center 194 of the sleeve 160, since an angle of about 45 degrees provides optimal solution with respect to thermal stress exerted at the first end and the ease of coupling. The sleeve 160 is shaped such that the diameter at the first end 162 is less than the diameter at the second end 164.

In addition, the second end 164 of the sleeve 160 is elongated radially to adaptively couple to the flange. More particularly, the second end 164 of the sleeve 160 has a radial elongation 165. The radial elongation 165 at the second end 164 enables coupling of the sleeve 160 to the flange. In one embodiment, the radial elongation 165 is at an angle of about 45 degrees from the longitudinal axis 192. An angle of about 45 degrees enables reduction of stress and also an ease of coupling. It may be noted that stress acting horizontally is greater than the stress acting at an angle, since a cosine component of the horizontal stress acting on an object is less.

Figure 8:
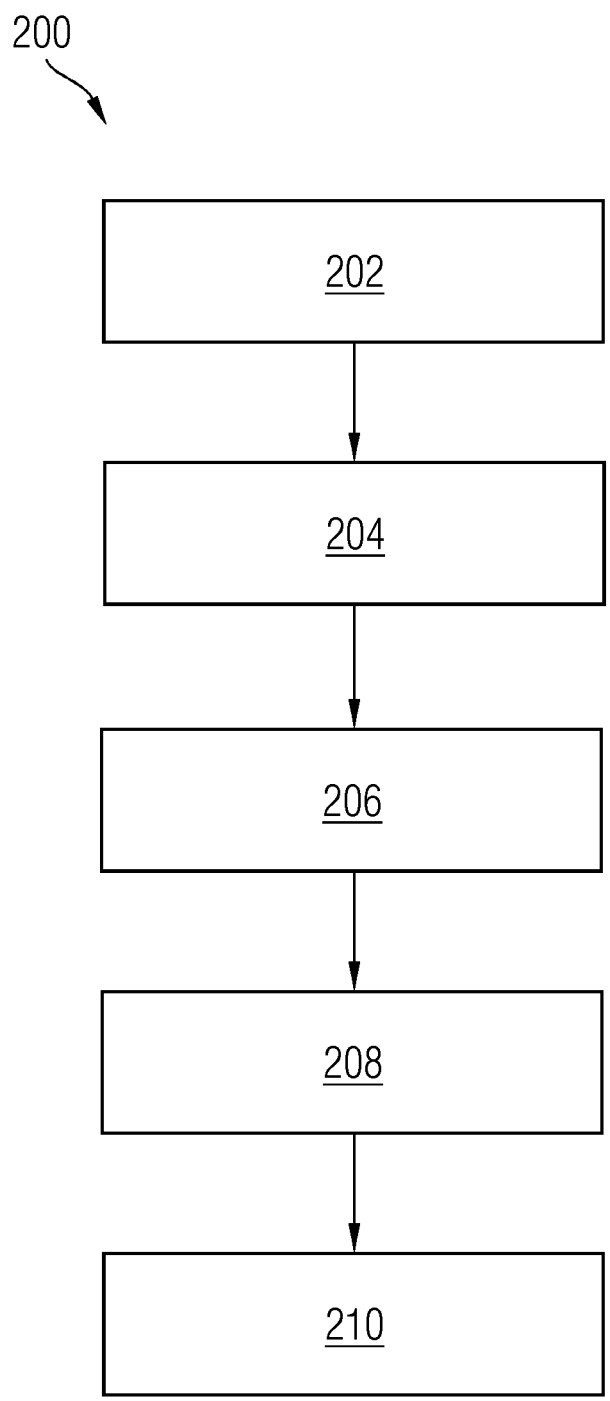
FIG. 8 is a flowchart depicting an exemplary method for assembling the assembly of FIG. 5 for a gas turbine.

FIG. 8 is a flowchart 200 depicting a method for assembling the exemplary assembly 180 (see FIG. 5) for the gas turbine. At step 202, the gas supply pipe 126 is passed through the bore in the flange 140 to supply gas to the combustion chamber 108 of the gas turbine. A sleeve 160 is inserted circumscribing the gas supply pipe, as at step 204. The sleeve is extended along the thickness of the flange, as at step 206. As previously noted, the sleeve has a first end located at a first longitudinal position of the sleeve outside the bore of the flange, distal to the combustion chamber. In addition, the sleeve has a second end located at a second longitudinal position of the sleeve inside the bore of the flange in a half towards the combustion chamber.

The second end of the sleeve is sealingly coupled to the inside of the bore in the flange, as at step 208. Thereafter, the first end of the sleeve 160 is sealingly coupled to the gas supply pipe, as at step 210. Welding is employed to sealingly couple the first end and the second end of the sleeve to the gas supply pipe 126 and the flange 140 respectively.

In accordance with aspects of the present technique, the second end 164 of the sleeve 160 is welded to the inside of the bore in the flange 140 before attaching the first end 162 of the sleeve 160 to the gas supply pipe 126. Welding the sleeve 160 at the second end 164 and thereafter at the first end 162 enables ease of assembling the sleeve 160.

The exemplary assembly as described hereinabove prevents hot air from the compressor exit the gas turbine into the surrounding environment, due to the sealing arrangement and design of the sleeve. In addition, the assembly also provides reduction in thermal stress at welding joints where the sleeve is attached to the gas supply pipe and the flange.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. An assembly for a gas turbine engine comprising:
a flange with a first side and a second side,
a rocket unit coupled to the first side of the flange, the rocket unit comprising one or more nozzles having a base in contact with the first side of the flange, a gas supply pipe connected to the base, and one or more swirlers connected to an axially opposite side of the one or more nozzles relative to the base,
wherein the gas supply pipe is configured to pass through a bore in the flange for supplying gas to a combustion chamber of the gas turbine engine, and
a sleeve, surrounding the gas supply pipe, having a first end and a second end,
wherein the first end is sealingly coupled to the gas supply pipe,
wherein the sleeve is sealingly coupled to the flange at the second end such that the sleeve extends along a thickness of the flange,
wherein the sleeve has a longitudinal extension which is radially extended around a circumference of the sleeve,
wherein the longitudinal extension comprises a V-shaped portion arranged perpendicular to a longitudinal axis extending through a central portion of the sleeve, and wherein a first portion of the V-shaped portion of the sleeve couples to the gas supply pipe at an oblique angle.

2. The assembly according to claim 1, wherein the second end is located at a second longitudinal position of the sleeve inside the bore in the flange.

3. The assembly according to claim 1, wherein longitudinal extension is located proximal to the first end of the sleeve.

4. The assembly according to claim 1, wherein the oblique angle comprises an angle of about 45 degrees.

5. The assembly according to claim 1, wherein the first end is located at a first longitudinal position of the sleeve outside the bore in the flange, distal from the combustion chamber.

6. The assembly according to claim 5, wherein the second end is located at a second longitudinal position of the sleeve inside the bore in the flange.

7. The assembly according to claim 6, wherein the second end of the sleeve is elongated radially to adaptively couple to the flange.

8. A method for assembling a gas turbine engine comprising:
passing a gas supply pipe through a bore of a flange for supplying gas to a combustion chamber of a gas turbine engine,
circumscribing the gas supply pipe with a sleeve having a first end and a second end,
extending the sleeve through a thickness of the flange,
welding the first end of the sleeve with the gas supply pipe,
welding the second end of the sleeve to the flange,
wherein the flange comprises a first side and a second side, and
wherein a rocket unit is coupled on the first side of the flange, the rocket unit comprising one or more nozzles having a base in contact with the first side of the flange, the gas supply pipe connected to the base, and one or more swirlers connected to an axially opposite side of the one or more nozzles relative to the base.

9. The method according to claim 8, wherein the first end is located at a first longitudinal position of the sleeve outside the bore of the flange, distal from the combustion chamber.

10. The method according to claim 8, wherein the second end is located at a second longitudinal position of the sleeve inside the bore of the flange.

11. The method according to claim 10, wherein the second end of the sleeve is elongated radially to adaptively couple to the flange.

12. The method according to claim 8, further comprising:
extending a section of the sleeve radially around the circumference of the sleeve.

13. The method according to claim 12, wherein the section of the sleeve is extended radially such that the sleeve is coupled at the first end to the gas supply pipe longitudinally at an oblique angle.

14. The method according to claim 12, wherein the section is located proximal to the first end of the sleeve.

15. A gas turbine engine comprising:
a compressor for supplying hot air,
a combustion chamber for generating a working gas by mixing gas and the hot air from the compressor,
an assembly, comprising:
a flange with a first side and a second side,
a rocket unit coupled to the first side of the flange, the rocket unit comprising one or more nozzles having a base in contact with the first side of the flange, a gas supply pipe connected to the base, and one or more swirlers connected to an axially opposite side of the one or more nozzles relative to the base,
wherein the gas supply pipe extends through a bore of a flange for supplying gas to the combustion chamber, and
a sleeve surrounding the gas supply pipe, extending along a thickness of the flange, having a first end and a second end,
wherein the first end is sealingly coupled to the gas supply pipe and the second end is sealingly coupled to the flange,
wherein the sleeve has a longitudinal extension which is radially extended around a circumference of the sleeve,
wherein the longitudinal extension comprises a V-shaped portion arranged perpendicular to a longitudinal axis extending through the sleeve, and
wherein a first portion of the V-shaped portion sleeve couples to the gas supply pipe at an oblique angle.

16. The gas turbine according to claim 15, wherein the first end of the sleeve is coupled to the gas supply pipe from outside the bore in the flange and the second end of the sleeve is coupled inside of the bore in the flange.

17. The gas turbine according to claim 15, wherein the oblique angle comprises an angle of about 45 degrees.

* * * * *